US011979012B2

(12) United States Patent
Nakashima et al.

(10) Patent No.: US 11,979,012 B2
(45) Date of Patent: May 7, 2024

(54) ELECTRIC CONNECTION BOX AND WIRE HARNESS

(71) Applicants: YAZAKI CORPORATION, Tokyo (JP); TOYOTA JIDOSHA KABUSHIKI KAISHA, Aichi-ken (JP); SUBARU CORPORATION, Tokyo (JP)

(72) Inventors: Akinori Nakashima, Makinohara (JP); Keita Miyahara, Nagakute (JP); Kazuya Kushibiki, Tokyo (JP)

(73) Assignees: YAZAKI CORPORATION, Tokyo (JP); TOYOTA JIDOSHA KABUSHIKI KAISHA, Aichi-ken (JP); SUBARU CORPORATION, Tokyo (JP)

(*) Notice: Subject to any disclaimer, the term of this patent is extended or adjusted under 35 U.S.C. 154(b) by 0 days.

(21) Appl. No.: 17/951,714

(22) Filed: Sep. 23, 2022

(65) Prior Publication Data

US 2023/0102856 A1 Mar. 30, 2023

(30) Foreign Application Priority Data

Sep. 24, 2021 (JP) ................................. 2021-156112

(51) Int. Cl.
*H02G 3/08* (2006.01)
(52) U.S. Cl.
CPC .................................. *H02G 3/083* (2013.01)
(58) Field of Classification Search
CPC ..................................................... H02G 3/088
See application file for complete search history.

(56) References Cited

U.S. PATENT DOCUMENTS

| 5,578,792 | A | * | 11/1996 | Devonald, III | .......... | H02B 7/06 |
| | | | | | | 361/605 |
| 5,864,091 | A | * | 1/1999 | Sumida | .................. | H02G 3/088 |
| | | | | | | 174/50 |
| 6,133,527 | A | * | 10/2000 | Park | ......................... | H02G 3/18 |
| | | | | | | 174/650 |
| 6,191,356 | B1 | * | 2/2001 | Daoud | .................. | H02G 3/088 |
| | | | | | | 174/58 |

(Continued)

FOREIGN PATENT DOCUMENTS

| JP | 2009-201292 A | 9/2009 |
| JP | 2009201292 A | * 9/2009 |

(Continued)

*Primary Examiner* — Krystal Robinson
(74) *Attorney, Agent, or Firm* — Sughrue Mion, PLLC

(57) ABSTRACT

There are provided an electric connection box and a wire harness including: a body including an accommodating portion inside the body, the accommodating portion being configured to accommodate an electronic component. The body includes an electric wire holding portion inside the body, the electric wire holding portion having a slit-shaped groove configured to radially sandwich and hold an electric wire extending from a connector to be connected to the electronic component. The groove of the electric wire holding portion includes: a groove inlet portion; a groove deepest portion; and a narrow portion between the groove inlet portion and the groove deepest portion. A groove width in the narrow portion is narrower than a groove width in the groove inlet portion.

4 Claims, 7 Drawing Sheets

(56) References Cited

U.S. PATENT DOCUMENTS

| | | | | |
|---|---|---|---|---|
| 6,768,054 B2* | 7/2004 | Sato | ............... | H02G 3/088 |
| | | | | 174/53 |
| 7,122,738 B2* | 10/2006 | Kanamaru | ............ | H01R 13/518 |
| | | | | 361/600 |
| 7,381,889 B2* | 6/2008 | Hara | ............... | B60R 16/0238 |
| | | | | 439/76.1 |
| 7,780,459 B2* | 8/2010 | Yamamoto | ............ | H02G 3/083 |
| | | | | 439/456 |
| 7,934,934 B2* | 5/2011 | Taniguchi | ............ | H02G 3/083 |
| | | | | 439/76.1 |
| 10,312,675 B2* | 6/2019 | Kakimi | ............ | H02G 3/088 |
| 2003/0000726 A1* | 1/2003 | Miyakoshi | ............ | H02G 3/081 |
| | | | | 174/650 |
| 2013/0003264 A1 | 1/2013 | Kamo | | |

FOREIGN PATENT DOCUMENTS

| | | | | |
|---|---|---|---|---|
| JP | 2013-13290 A | | 1/2013 | |
| JP | 2013013290 A | * | 1/2013 | ......... B60R 16/0238 |

* cited by examiner

ELECTRIC CONNECTION BOX AND WIRE HARNESS

CROSS-REFERENCE TO RELATED APPLICATIONS

This application is based on and claims priority under 35 USC 110 from Japanese Patent Application No. 2021-156112 filed on Sep. 24, 2021, the contents of which are incorporated herein by reference.

TECHNICAL FIELD

The present disclosure relates to an electric connection box that accommodates an electronic component, and a wire harness using the electric connection box.

BACKGROUND ART

An electric connection box having an accommodating portion inside for accommodating an electronic component such as a relay or a fuse therein, such as a relay box mounted on a vehicle, has been proposed in the related art (see, for example, JP2013-013290A).

Generally, in the electric connection box described above, a body having a box shape in which an upper side and a lower side are open in a posture when mounted on a vehicle is provided, an electronic component such as a relay or a fuse are accommodated in the accommodating portion from the upper side of the body, and an electric wire with connector corresponding to the electronic components is connected to the accommodating portion from the lower side of the body. After the attachment of the electronic component and the electric wire with connector to the accommodating portion is completed, upper and lower openings of the body are closed by lid portions (so-called upper cover and lower cover), so that a wire harness including the electric connection box, the electronic component, and the electric wire with connector is obtained.

Due to the specifications or the like of the vehicle on which the wire harness is mounted (that is, wired), in a manufacturing stage of the wire harness, the electronic component may not be accommodated in a part of the accommodating portion of the electric connection box, and a part of the accommodating portion may be a blank portion. In the blank portion, for example, at a stage of mounting the wire harness on the vehicle or at a preparation stage thereof, an electronic component (for example, semiconductor power integration for driving a load, so-called PR) corresponding to the specification of the vehicle is retrofitted and accommodated. In this case, the electric wire with connector for connecting the electronic component to be retrofitted is attached to the electric connection box in advance at a stage before the electronic component is accommodated (that is, a manufacturing stage of the wire harness). As an example, a dedicated connector temporary locking portion is provided in the electric connection box, and the electric wire with connector for retrofitting is temporarily locked to the connector temporary locking portion at the manufacturing stage of the wire harness.

However, in a case where the electric wire with connector is temporarily locked to the electric connection box as in the above-described example, the electric wire with connector may be unintentionally separated from the connector temporary locking portion due to vibration or the like when the wire harness is transported to be mounted on the vehicle, and the electric wire with connector may fall into the electric connection box (for example, into a space between the accommodating portion and the lower cover). When such a fall occurs, it is necessary to take out the electric wire with connector from the inside of the electric connection box to the outside in a step of retrofitting the electronic component. Such a take-out operation may be a cause of impairing the workability of an operation for mounting the wire harness on the vehicle.

Further, since the electric wire with connector is normally disposed on the lower side of the accommodating portion (that is, on the lower cover side), the electric wire with connector for retrofitting is pulled out above the accommodating portion and locked to the connector temporary locking portion in preparation for the step of retrofitting the electronic component from the upper side of the accommodating portion. Therefore, a wasteful extra length is required for the electric wire by an amount by which the electric wire with connector is pulled out in this manner. The wasteful extra length of the electric wire may cause an increase in the manufacturing cost of the wire harness. In addition, after the work of attaching the electric wire with connector to the accommodating portion from the lower side of the accommodating portion is completed, the work of pulling out the electric wire with connector from the upper side of the accommodating portion is performed only in order to temporarily lock the electric wire with connector for retrofitting to the accommodating portion. Such a pull-out operation may be a cause of impairing the workability of an operation for manufacturing the wire harness.

As described above, there is room for improvement in the structure for temporarily holding the electric wire with connector for retrofitting to the electric connection box, in terms of workability when the wire harness is mounted on the vehicle, in terms of manufacturing cost of the wire harness, and in terms of workability when the wire harness is manufactured.

SUMMARY OF INVENTION

The present disclosure provides an electric connection box excellent in temporary holding performance of an electric wire with connector for retrofitting, and a wire harness using the electric connection box.

According to an illustrative aspect of the present disclosure, an electric connection box includes: a body including an accommodating portion inside the body, the accommodating portion being configured to accommodate an electronic component. The body includes an electric wire holding portion inside the body, the electric wire holding portion having a slit-shaped groove configured to radially sandwich and hold an electric wire extending from a connector to be connected to the electronic component. The groove of the electric wire holding portion includes: a groove inlet portion; a groove deepest portion; and a narrow portion between the groove inlet portion and the groove deepest portion. A groove width in the narrow portion is narrower than a groove width in the groove inlet portion.

According to another illustrative aspect of the present disclosure, a wire harness includes: the electric connection box as mentioned above; and an electric wire with connector to be connected to the electronic component. The electric wire holding portion is configured such that: the groove width in the narrow portion is smaller than an electric wire diameter of the electric wire with connector, the groove width in the groove inlet portion is equal to or larger than the electric wire diameter; and a groove width between the narrow portion and the groove deepest portion has a dimension that prevents the connector of the electric wire with connector from passing through. The electric wire with connector is held by the electric wire holding portion in a state where the electric wire is sandwiched by the electric wire holding portion between the narrow portion and the groove deepest portion of the electric wire holding portion.

The present disclosure is briefly described above. Details of the present disclosure will be further clarified by reading an aspect for implementing the disclosure to be described below with reference to the accompanying drawings.

DESCRIPTION OF EMBODIMENTS

Embodiment

Hereinafter, a wire harness 3 using an electric connection box 1 according to an embodiment of the present disclosure shown in FIG. 1 will be described with reference to the drawings. The electric connection box 1 is typically a relay box that is mounted on a vehicle and has an internal space for accommodating electronic components such as a relay and a fuse and other components such as a plurality of components 4 (see FIG. 1) and an electronic component 5 (see FIG. 1).

Figure 1:
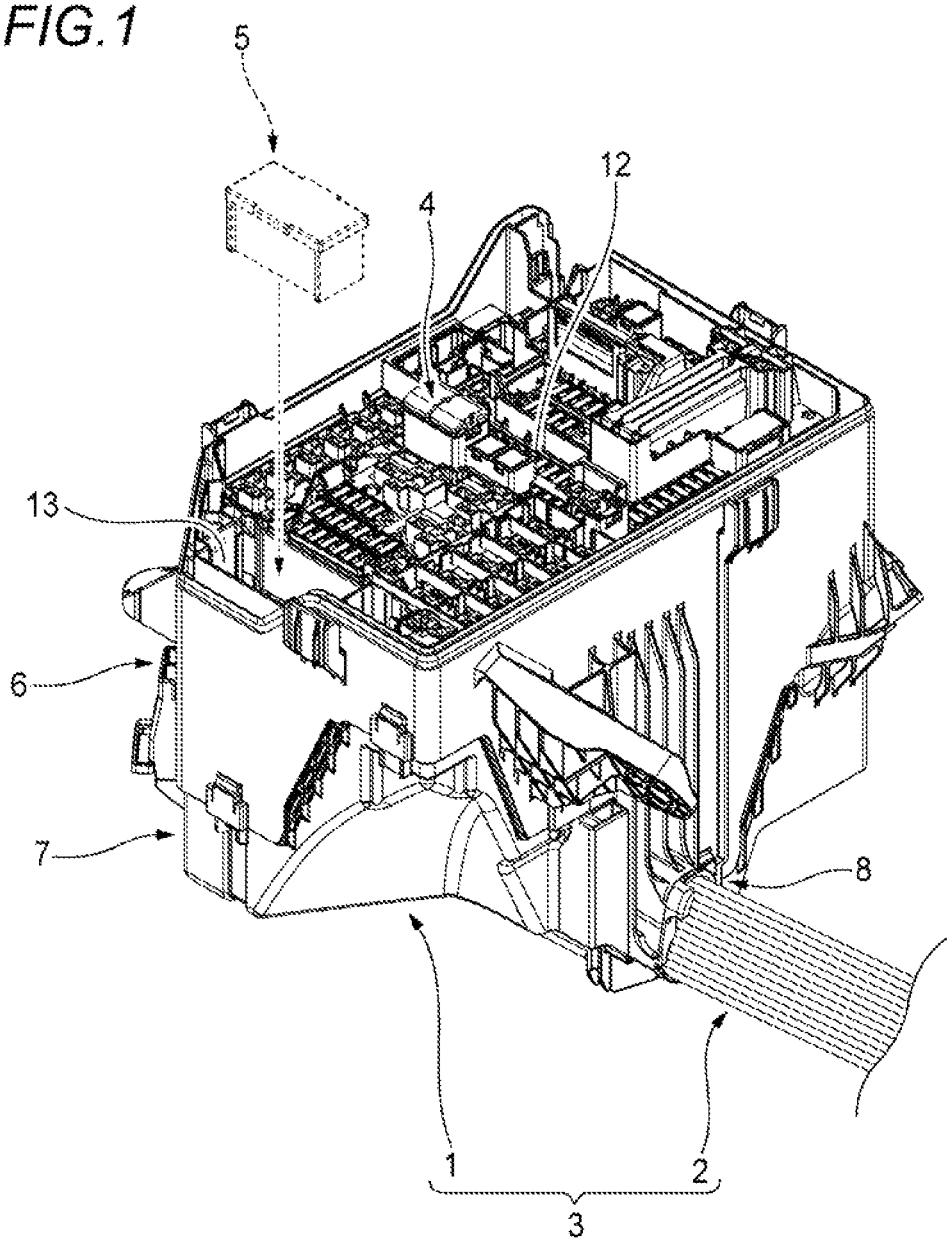
FIG. 1 is a perspective view of a wire harness using an electric connection box (an upper cover is not shown) according to an embodiment of the present disclosure.

Hereinafter, for convenience of description, as shown in FIG. 1, "front", "rear", "left", "right", "upper", and "lower" are defined. A "front-rear direction", a "left-right direction", and an "upper-lower direction" are orthogonal to one another. When the electric connection box 1 is mounted on a vehicle, the "front-rear direction", the "left-right direction", and the "upper-lower direction" respectively correspond to the front-rear direction, the left-right direction, and the upper-lower direction of the vehicle. In addition, a side facing the inside of the electric connection box 1 is referred to as "inside", and a side facing the outside of the electric connection box 1 is referred to as "outside".

In the electric connection box 1, as shown in FIG. 1, a plurality of electric wires with connector 2 having a connector electrically connected to a plurality of components 4 and an electronic component 5 located inside the electric connection box 1 at one end are led out to the outside of the electric connection box 1 via an electric wire lead-out hole 8 provided in a right side portion of the electric connection box 1. The electric connection box 1 and the electric wires with connector 2 led out from the electric connection box 1 constitute a wire harness 3.

The plurality of components 4 are components accommodated in a holding portion 12 (see FIG. 1) of the electric connection box 1 in a manufacturing stage of the wire harness 3. On the other hand, the electronic component 5 is an electronic component corresponding to the specification of the vehicle (for example, semiconductor power integration for driving a load, so-called P/1). The electronic component 5 is not accommodated in the electric connection box 1 in the manufacturing stage of the wire harness 3, and is retrofitted and accommodated in an accommodating portion 13 (see FIG. 1) of the electric connection box 1 in a subsequent mounting stage of the wire harness 3 on the vehicle or in a preparation stage of the mounting. Therefore, in the manufacturing stage of the wire harness 3, the accommodating portion 13 is a blank portion (see FIG. 1).

Among the plurality of electric wires with connector 2 extending from the electric connection box 1, electric wires to be connected to the plurality of components 4 are respectively connected to the plurality of components 4 at the manufacturing stage of the wire harness 3. Hereinafter, among the plurality of electric wires with connector 2 extending from the electric connection box 1, an electric wire to be connected to the electronic component 5 (for example, a P/1 to be retrofitted later) is particularly referred to as "electric wire with connector 2a" (see FIGS. 3 to 5). As shown in FIG. 5, the electric wire with connector 2a includes an electric wire 31 and a connector 32 provided at one end of the electric wire 31. For the electric wire with connector 2a, since there is no connection target (the electronic component 5 to be retrofitted later) in the manufacturing stage of the wire harness 3, the connector 32 is temporarily held by an electric wire holding portion 14 provided in the electric connection box 1 (see FIGS. 3 to 6). This will be described later.

Figure 2:
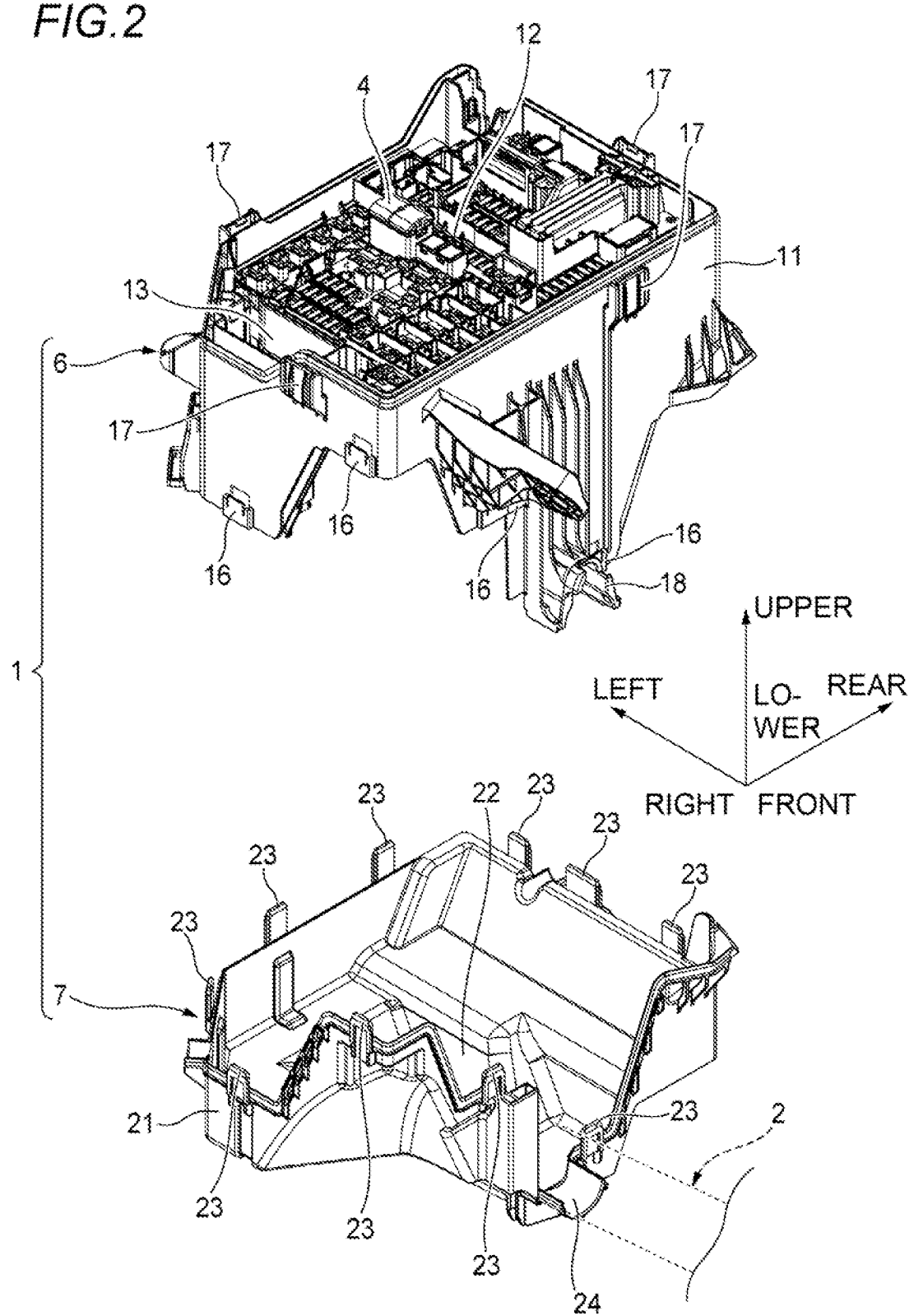
FIG. 2 is a perspective view of a frame and a lower cover shown in FIG. 1.

As shown in FIGS. 1 and 2, the electric connection box 1 includes a frame 6, a lower cover 7 to be assembled to a lower side of the frame 6 so as to close a lower end opening of the frame 6, and an upper cover (not shown) to be assembled to an upper side of the frame 6 so as to close an upper end opening of the frame 6. All of the three components constituting the electric connection box 1 are resin molded bodies.

Hereinafter, the frame 6, the lower cover 7, and the upper cover constituting the electric connection box 1 will be described in order. First, the frame 6 will be described. As shown in FIG. 2, the frame 6 includes a substantially rectangular tubular side wall portion 11 extending in the upper-lower direction. The side wall portion 11 constitutes most of the external appearance of a side face of the electric connection box 1.

As shown in FIGS. 1 and 2, the holding portion 12 is provided in most of the internal space of the frame 6 surrounded by the side wall portion 11 except for a part on a front end portion so as to extend in a direction orthogonal to the upper-lower direction. The plurality of components 4 are held by the holding portion 12 so as to be arranged along an extending direction of the holding unit 12. The accommodating portion 13 is provided in the part on the front end portion of the internal space of the frame 6. The electronic component 5 to be retrofitted is to be accommodated in the accommodating portion 13. Here, the accommodating portion 13 may have a hole portion passing through in the upper-lower direction, and the electronic component 5 may be inserted into the hole portion 13. The accommodating portion 13 is a substantially rectangular parallelepiped space corresponding to an outer shape of the electronic component 5, and is open on the upper side and the lower side.

Figure 3:
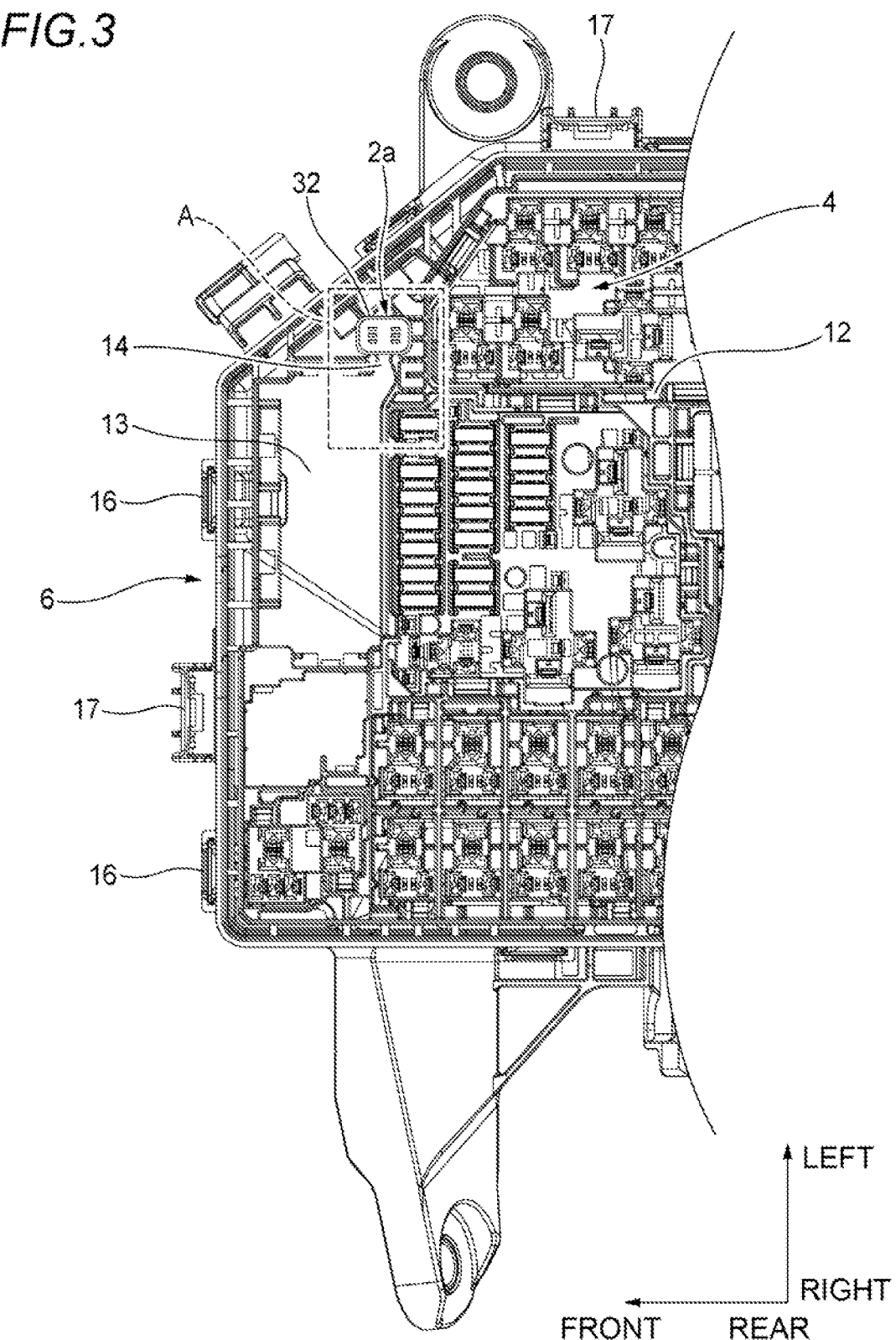
FIG. 3 is a top view of a portion of the frame shown in FIG. 2 including an accommodating portion.
Figure 4:
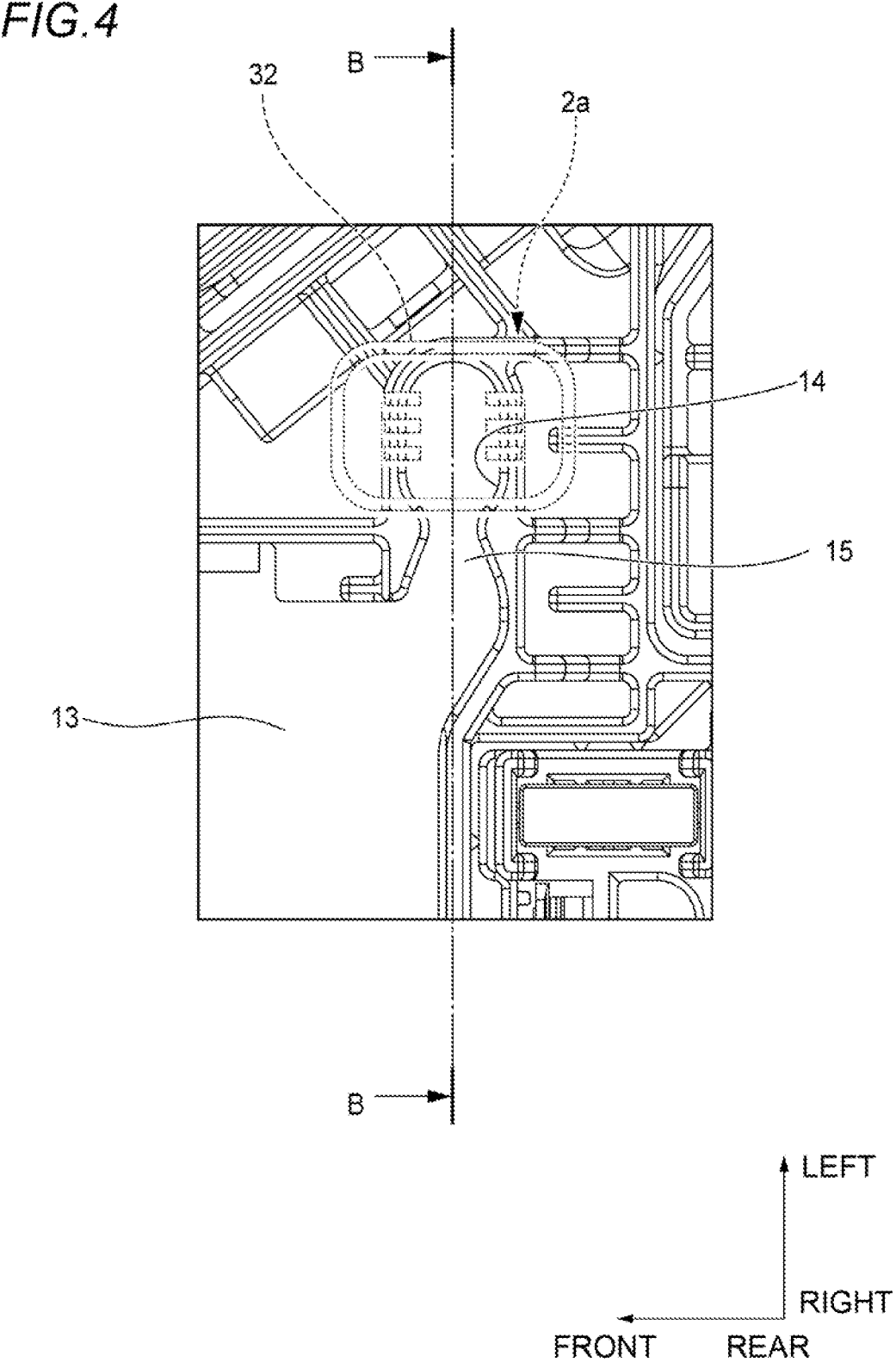
FIG. 4 is an enlarged view of a portion A in FIG. 3.
Figure 5:
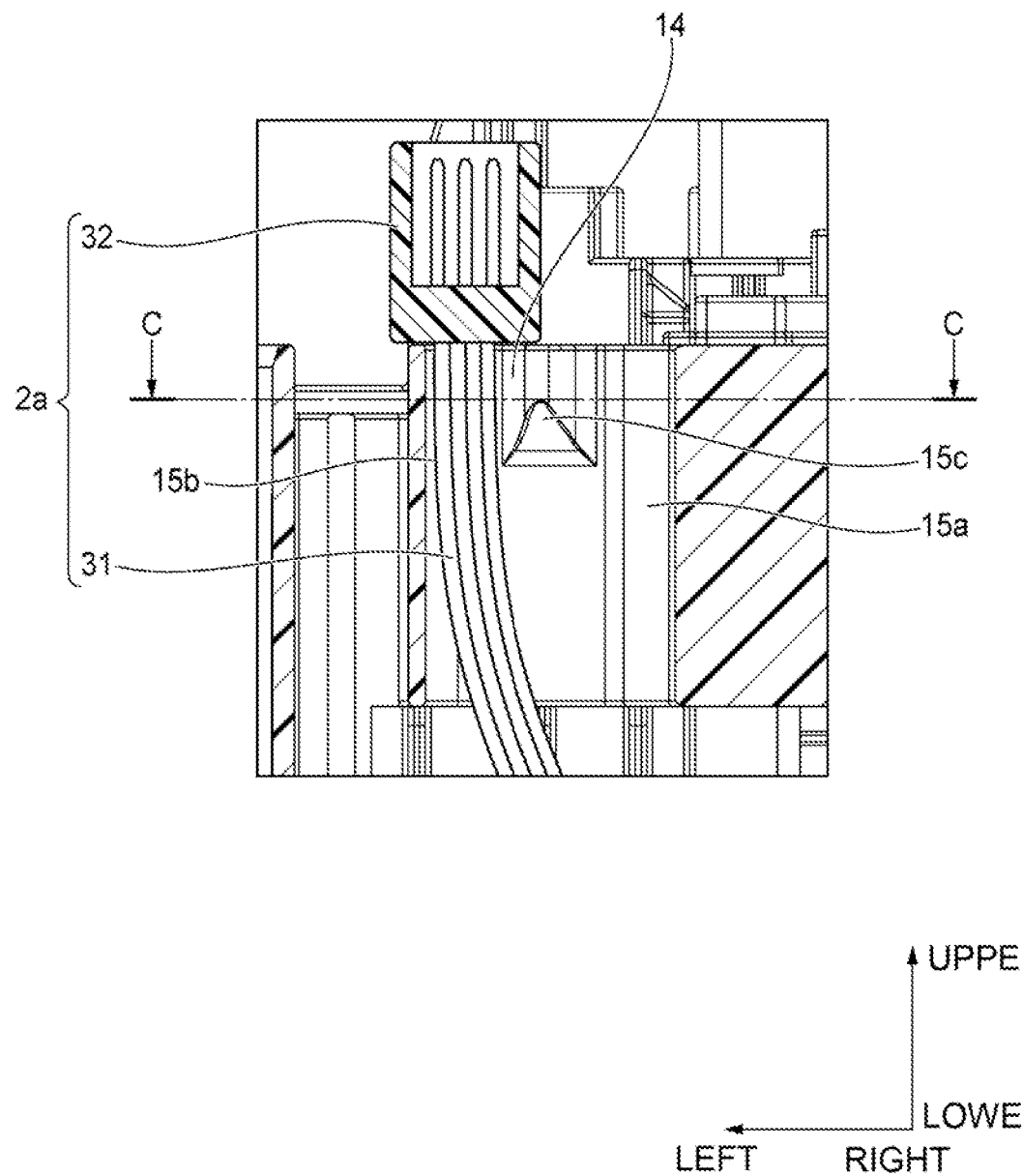
FIG. 5 is a cross-sectional view taken along a line B-B in FIG. 4.

As shown in FIGS. 3 and 4, the electric wire holding portion 14 is provided at a position adjacent to a left rear corner portion of the accommodating portion 13 in the internal space of the frame 6. The electric wire holding portion 14 has a slit-like groove 15 that communicates with a position in the vicinity of the left rear corner portion of the accommodating portion 13 and extends toward the left side from the position. The groove 15 passes through the accommodating portion 13 in the upper-lower direction.

Figure 6:
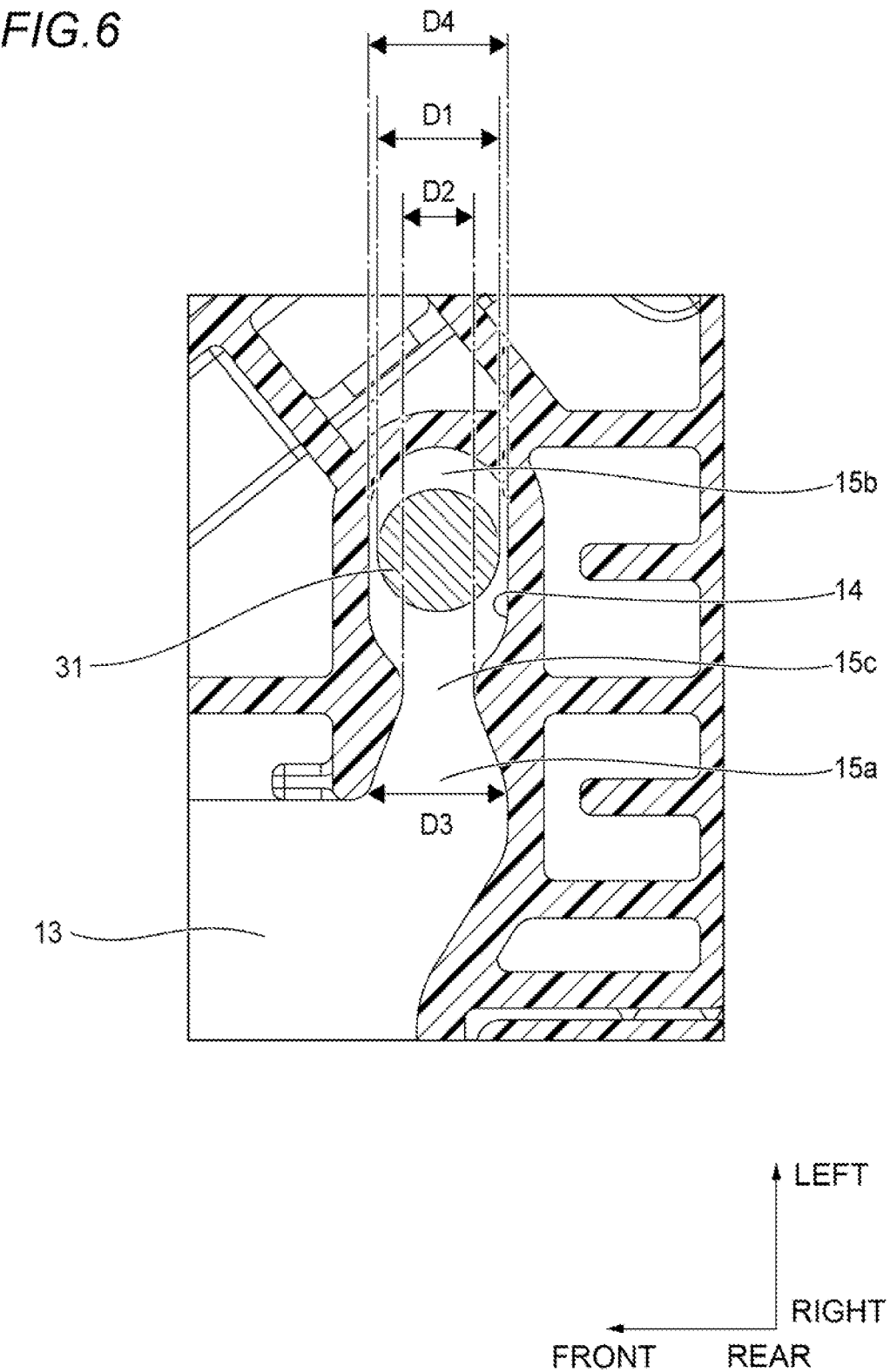
FIG. 6 is a cross-sectional view taken along a line C-C in FIG. 5.

A groove width (a distance in the front-rear direction) of the groove 15 extending in the left-right direction changes according to the position of the groove 15. Specifically, as shown in FIG. 6, the groove 15 has a narrow portion 15c between a groove inlet portion 15a communicating with the accommodating portion 13 and a groove deepest portion 15b which is a left end portion of the groove 15. A groove width D2 of the narrow portion 15c is smaller than an electric wire diameter D1 of the electric wire 31 of the electric wire with connector 2a, and a groove width D3 of the groove inlet portion 15a is equal to or larger than the electric wire diameter D1 of the electric wire 31. That is, the groove width D2 of the narrow portion 15c is narrower than the groove width D3 of the groove inlet portion 15a. A groove width D4 between the narrow portion 15c and the groove deepest portion 15b is set to such a size that the connector 32 of the electric wire with connector 2a cannot pass through.

In this example, the groove width D4 is slightly larger than the electric wire diameter D1 of the electric wire 31. However, the groove width D4 may be the same as the electric wire diameter D1 of the electric wire 31, or may be slightly smaller than the electric wire diameter D1 of the electric wire 31. The groove width D4 may be designed to have an appropriate size in terms of sandwiching and holding the electric wire 31 in a radial direction.

In FIG. 6, for convenience of explanation, the electric wire 31 is illustrated to have a single circular cross section. However, the electric wire 31 does not necessarily have to be constituted by one element wire, and may be an electric wire bundle in which a plurality of element wires are bundled. In a case where the electric wire 31 is an electric wire bundle, the electric wire diameter D1 may be defined as, for example, a diameter of a virtual circle in which an outer periphery of the electric wire bundle is inscribed at as many places as possible in a cross section of the electric wire bundle.

Locked portions 16 each having a through hole extending in the upper-lower direction are integrally provided at a plurality of positions (ten positions in this example) on an outer surface in a peripheral direction of a lower end portion of the side wall portion 11 (see FIG. 2). The locked portions 16 have a function of assembling the lower cover 7 to the frame 6.

Locked portions 17 are integrally provided at a plurality of positions (four positions in this example) on an outer surface in a peripheral direction of an upper end portion of the side wall portion 11 (see FIG. 2). The locked portions 17 have a function of assembling the upper cover to the frame 6.

A semi-cylindrical inverted U-shaped portion 18 that opens on the lower side is provided at a position corresponding to the electric wire lead-out hole 8 (see FIG. 1) in the side wall portion 11 so as to extend rightward (see FIG. 2). The inverted U-shaped portion 18 has a function of forming an upper portion of an inner wall defining the electric wire lead-out hole 8.

Next, the lower cover 7 will be described. As shown in FIG. 2, the lower cover 7 integrally includes an annular side wall portion 21 that constitutes most of the external appearance of a lower side face of the electric connection box 1, and a bottom wall portion 22 that closes an annular lower end opening of the side wall portion 21 and constitutes most of the external appearance of a bottom surface of the electric connection box 1. An annular upper end edge portion of the side wall portion 21 has a shape corresponding to an annular lower end edge portion of the side wall portion 11 of the frame 6, and can be fitted to the annular lower end edge portion of the side wall portion 11.

Locking pieces 23 extending upward are integrally provided at a plurality of positions (four positions in this example) on an outer surface in a peripheral direction of an upper end portion of the side wall portion 21 so as to correspond to the plurality of locked portions 16 of the frame 6 (see FIG. 2). A semi-cylindrical U-shaped portion 24 that opens on the upper side is provided at a position corresponding to the electric wire lead-out hole 8 (see FIG. 1) in the side wall portion 21 so as to extend rightward (see FIG. 2). The U-shaped portion 24 has a function of forming a lower portion of an inner wall defining the electric wire lead-out hole X.

Next, the upper cover (not shown) will be described. The upper cover integrally includes an annular side wall portion that constitutes most of the external appearance of an upper side face of the electric connection box 1, and an upper wall portion that closes an annular upper end opening of the side wall portion and constitutes most of the external appearance of an upper face of the electric connection box 1. An annular lower end edge portion of the side wall portion of the upper cover has a shape corresponding to an annular upper end edge portion of the side wall portion 11 of the frame 6, and can be fitted to the annular upper end edge portion of the side wall portion 11. Locking portions corresponding to the plurality of locked portions 17 of the frame 6 are integrally provided at a plurality of positions (four positions in this example) on an outer surface in a peripheral direction of the side wall portion of the upper cover.

The frame 6, the lower cover 7, and the upper cover constituting the electric connection box 1 have been described above.

Next, a manufacturing procedure of the wire harness 3 will be described. In order to manufacture the wire harness 3, first, the plurality of components 4 are assembled to the holding portion 12 of the frame 6 from the upper side. Next, the connectors of the plurality of electric wire with connectors 2 excluding the electric wire with connector 2a are respectively connected to the corresponding components 4 from the lower side. Thus, the plurality of components 4 and the plurality of electric wire with connectors 2 are electrically connected to each other.

Next, the connector 32 of the electric wire with connector 2a (that is, one end portion of the electric wire with connector 2a) is temporarily held by the holding portion 12 of the electric connection box 1 using the electric wire holding portion 14. Specifically, the connector 32 is inserted into the internal space of the accommodating portion 13 of the frame 6 from the lower side and moved to an upper edge portion of the accommodating portion 13 in the vicinity of the electric wire holding portion 14. Next, the electric wire 31 of the electric wire with connector 2a in the vicinity of the connector 32 is pushed from the groove inlet portion 15a of the electric wire holding portion 14 toward the groove deepest portion 15b. Accordingly, the electric wire 31 can pass through while the narrow portion 15c of the electric wire holding portion 14 is spread by the electric wire 31, and the electric wire 31 can be held in the groove 15 between the narrow portion 15c and the groove deepest portion 15b (see FIG. 6). In addition, as shown in FIGS. 3 to 5, the connector 32 of the electric wire with connector 2a can be held in a state of being placed on a peripheral edge of the groove 15 of the electric wire holding portion 14.

As described above, it is not necessary to pull out and hold the electric wire with connector as in the example of the related art described above, so that it is possible to reduce the wasteful extra length of the electric wire 31. Further, the operation of pushing the electric wire 31 of the electric wire with connector 2a into the groove 15 of the electric wire holding portion 14 can be performed from the same lower side as the side on which the plurality of electric wires with connector 2 other than the electric wire with connector 2a are assembled to the holding portion 12. Therefore, the workability of the operation of temporarily holding the electric wire with connector 2a can be improved.

Further, the groove width D2 of the narrow portion 15c is smaller than the electric wire diameter D1 of the electric wire 31 of the electric wire with connector 2a. Therefore, even if vibration or the like is applied to the wire harness 3 when the manufactured wire harness 3 is transported so as to be mounted on a vehicle, it is possible to prevent unintentional separation of the electric wire 31 of the electric wire with connector 2a from the groove 15 of the electric wire holding portion 14.

After the temporary holding of the electric wire with connector 2a is completed, the lower cover 7 and the upper cover are assembled to the frame 6. In order to assemble the lower cover 7 to the frame 6, first, in a state where the electric wires of the plurality of electric wires with connector 2 (including the electric wire with connector 2a) extending downward from the internal space of the frame 6 to the outside of the frame 6 are bundled, the plurality of locking pieces 23 (see FIG. 2) of the lower cover 7 are inserted into the plurality of through holes of the locked portions 16 (see FIG. 2) of the frame 6 from the lower side, and the electric wire bundle is disposed between the inverted U-shaped portion 18 of the frame 6 and the U-shaped portion 24 of the lower cover 7. Then, from this state, the annular upper end edge portion of the side wall portion 21 of the lower cover 7 is fitted to the annular lower end edge portion of the side wall portion 11 of the frame 6, and the plurality of locking pieces 23 are locked to the plurality of locked portions 16. Thus, the assembly of the lower cover 7 to the frame 6 is completed (see FIG. 1).

Similarly, in order to assemble the upper cover to the frame 6, the annular lower end edge portion of the side wall portion of the upper cover is fitted to the annular upper end edge portion of the side wall portion 11 of the frame 6, and the plurality of locking portions of the upper cover are locked to the plurality of locked portions 17 of the frame 6. Thus, the assembly of the upper cover to the frame 6 is completed. In this way, when the assembly of the lower cover 7 and the upper cover to the frame 6 is completed, the assembly of the electric connection box 1 is completed, and the manufacturing (assembly) of the wire harness 3 is completed.

In the assembly completion state of the electric connection box 1 (the manufacturing completion state of the wire harness 3), the lower cover 7 is prevented from being separated downward from the frame 6 by the locking of the plurality of locking pieces 23 and the plurality of locked portions 16. Similarly, the upper cover is prevented from being separated upward from the frame 6 by the locking of the plurality of locking portions of the upper cover and the plurality of locked portions 17. Further, the electric wire lead-out hole 8 is defined by the inverted U-shaped portion 18 of the frame 6 and the U-shaped portion 24 of the lower cover 7 (see FIG. 1), and the electric wires of the plurality of electric wires with connector 2 are led out to the outside of the electric connection box 1 through the electric wire lead-out hole 8 (see FIG. 1).

The wire harness 3 in a state in which the manufacture is completed and the electric wire with connector 2a is temporarily held is then mounted (that is, routed) on the vehicle. At the stage of mounting the wire harness 3 on the vehicle or at the preparation stage of the mounting, the electronic component 5 corresponding to the specifications of the vehicle is prepared, the electronic component 5 is connected to the connector 32 of the electric wire with connector 2a, and the electronic component 5 is accommodated in the accommodating portion 13 of the electric connection box 1.

Figure 7:
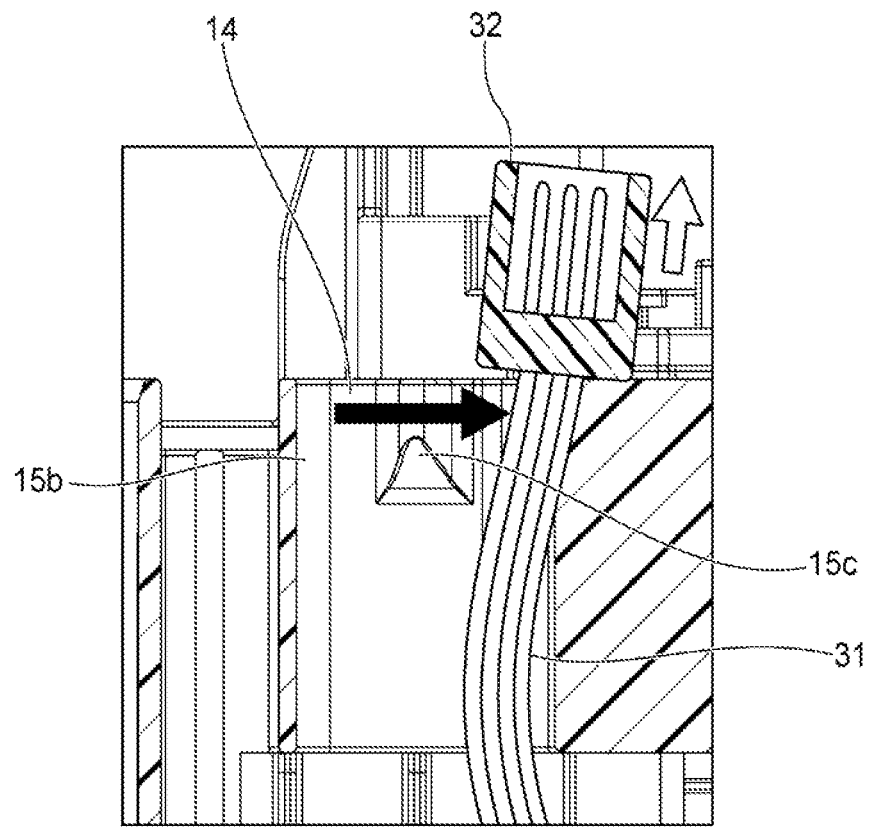
FIG. 7 is a cross-sectional view corresponding to FIG. 5, showing a state in which an electric wire with connector for retrofitting is pulled out from an electric wire holding portion.

Specifically, first, the upper cover assembled to the frame 6 is removed from the frame 6. Next, as indicated by a black arrow in FIG. 7, the electric wire 31 of the electric wire with connector 2a held in the groove 15 of the electric wire holding portion 14 is drawn out from the groove 15 to the accommodating portion 13. Then, as indicated by a white arrow in FIG. 7, the connector 32 of the electric wire with connector 2a is brought closer to the electronic component 5 to be retrofitted, and is connected to the electronic component 5. Thereafter, the electronic component 5 connected to the connector 32 is accommodated in the accommodating portion 13 from the upper side. In this manner, in a state where the lower cover 7 is assembled to the frame 6 and the electric wire 31 of the electric wire with connector 2a is inserted into the electric wire lead-out hole 8 (that is, without removing the lower cover 7), the operation of accommodating the electronic component 5 in the accommodating portion 13 and connecting the electric wire with connector 2a to the electronic component 5 can be performed from the upper end opening of the frame 6. When the operation of connecting the electronic component 5 and the connector 32 of the electric wire with connector 2a and the operation of accommodating the electronic component 5 in the accommodating portion 13 are completed, the upper cover is assembled to the frame 6 again.

Functions and Effects

As described above, according to the electric connection box 1 and the wire harness 3 of the present embodiment, the electric wire holding portion 14 of the frame 6 of the electric connection box 1 includes the slit-shaped groove 15 configured to be able to hold the electric wire 31 of the electric wire with connector 2a to be connected to the electronic component 5 by sandwiching the electric wire 31 in the radial direction. The electric wire holding portion 14 has the narrow portion 15c between the groove inlet portion 15a and the groove deepest portion 15b of the electric wire holding portion 14, and is configured such that the groove width D2 in the narrow portion 15c is smaller than the electric wire diameter D1 of the electric wire 31 of the electric wire with connector 2a, and the groove width D3 in the groove inlet portion 15a is equal to or larger than the electric wire diameter D1. Therefore, when temporarily holding the electric wire with connector 2a for retrofitting in the electric connection box 1, the electric wire 31 of the electric wire with connector 2a is pushed from the groove inlet portion 15a toward the groove deepest portion 15b of the electric wire holding portion 14, so that the electric wire 31 can pass through while the narrow portion 15c of the electric wire holding portion 14 is spread by the electric wire 31, and the electric wire 31 can be held between the narrow portion 15c and the groove deepest portion 15b. Here, the groove width D4 between the narrow portion 15c and the groove deepest portion 15b is large enough to prevent the connector 32 of the electric wire with connector 2a from passing therethrough, so that the connector 32 can be held in a state of being placed on a slit peripheral edge of the electric wire holding portion 14.

Therefore, it is not necessary to pull out and hold the electric wire with connector as in the example of the related art described above, so that it is possible to reduce the wasteful extra length of the electric wire 31. Further, the operation of pushing the electric wire 31 of the electric wire with connector 2a into the slit of the electric wire holding portion 14 can be performed from a side (lower side) on which other electric wires with connector 2, which are not for retrofitting, are assembled to the holding portion 12. As a result, the workability of the operation of temporarily holding the electric wire with connector 2a can be improved. Therefore, the electric connection box 1 and the wire harness 3 according to the present embodiment are excellent in temporary holding the electric wire with connector 2a for retrofitting.

Further, the electric wire holding portion 14 is disposed adjacent to the accommodating portion 13 that accommodates the electronic component 5 for retrofitting. Accordingly, when the electronic component 5 for retrofitting is accommodated in the accommodating portion 13, the operation of connecting the electric wire with connector 2a to the electronic component 5 is facilitated. Therefore, the workability of the operation of retrofitting the electronic component 5 can be improved.

Further, in a state where the lower cover 7 is assembled to the frame 6 and the electric wire 31 is inserted into the electric wire lead-out hole 8 (that is, without removing the lower cover 7), the operation of accommodating the electronic component 5 for retrofitting in the accommodating portion 13 and connecting the electric wire with connector 2a to the electronic component 5 can be performed from the upper end opening of the frame 6. Therefore, the workability of the operation of retrofitting the electronic component 5 can be improved.

Other Embodiments

The present disclosure is not limited to the above-described embodiment, and various modifications can be used within the scope of the present disclosure. For example, the present disclosure is not limited to the above embodiments, and modifications, improvements, and the like can be made as appropriate. In addition, materials, shapes, dimensions, numbers, arrangement locations or the like of components in the embodiments described above are optional and are not limited as long as the present disclosure can be achieved.

In the above embodiment, the electric wire holding portion 14 is disposed adjacent to the accommodating portion 13. Alternatively, the electric wire holding portion 14 may be disposed at a position away from the accommodating portion 13.

Here, characteristics of the embodiment of the electric connection box 1 and the wire harness 3 according to the present disclosure described above are summarized briefly in the following first to fourth aspects, respectively.

According to a first aspect of the present disclosure, an electric connection box (I) includes: a body (6) including an accommodating portion (13) inside the body (6), the accommodating portion being configured to accommodate an electronic component (5). The body (6) includes an electric wire holding portion (14) inside the body (6), the electric wire holding portion (14) having a slit-shaped groove (15) configured to radially sandwich and hold an electric wire (31) extending from a connector (32) to be connected to the electronic component (5). The groove (15) of the electric wire holding portion (14) includes: a groove inlet portion (15a); a groove deepest portion (15b); and a narrow portion (15c) between the groove inlet portion (15a) and the groove deepest portion (15b). A groove width (D2) in the narrow portion (15c) is narrower than a groove width (D3) in the groove inlet portion (15a).

According to the electric connection box of the first aspect, the electric wire holding portion included in the body of the electric connection box has the slit-shaped groove configured to be able to hold the electric wire (for example, the electric wire with connector for retrofitting described above) extending from the connector and to be connected to the electronic component by sandwiching the electric wire in the radial direction. The electric wire holding portion includes the narrow portion between the groove inlet portion and the groove deepest portion of the electric wire holding portion, and is configured such that the groove width of the narrow portion is narrower than the groove width of the groove inlet portion. Therefore, for example, when temporarily holding the electric wire with connector for retrofitting in the electric connection box, the electric wire extending from the connector is pushed from the groove inlet portion toward the groove deepest portion of the electric wire holding portion, so that the electric wire can pass through while the narrow portion of the electric wire holding portion is spread by the electric wire, and the electric wire can be temporarily held between the narrow portion and the groove deepest portion. At this time, for example, the connector can be temporarily held in a state of being placed on the slit peripheral edge of the electric wire holding portion. Therefore, when the electric wire is temporarily held by the electric wire holding portion, the electric wire is prevented, by the narrow portion, from being unintentionally separated from the electric wire holding portion. Further, it is not necessary to pull out the electric wire with connector for retrofitting from the accommodating portion as in the example of the related art described above, so that the wasteful extra length of the electric wire can be reduced. In addition, the operation of pushing the electric wire into the slit of the electric wire holding portion can be performed from a side (for example, the lower side of the accommodating portion described above) on which an ordinary electric wire with connector, which is not for retrofitting, is assembled to the accommodating portion. Therefore, the workability of the temporary holding work can be improved. As described above, the electric connection box having the configuration is superior to the electric connection box in the related art in temporarily holding the electric wire with connector for retrofitting.

According to a second aspect of the present disclosure, the accommodating portion (13) may include a hole portion into which the electronic component (5) is inserted. The groove inlet portion (15a) may be provided in an inner surface of the hole portion to open toward an inside of the hole portion, and the groove (15) is provided to extend in a direction away from the inside of the hole portion.

According to the electric connection box of the second aspect, the electric wire holding portion is disposed at a peripheral edge portion of the hole portion into which the electronic component is inserted when the electronic component for retrofitting is accommodated. In other words, the electric wire holding portion is disposed adjacent to the accommodating portion. Accordingly, when the electronic component for retrofitting is accommodated in the accommodating portion, the operation of connecting the electric wire with connector to the electronic component is facilitated. Therefore, the workability of the operation of retrofitting the electronic component can be improved.

According to a third aspect of the present disclosure, the electric connection box (I) may further include: an outer wall portion (II) annularly surrounding the accommodating portion (13); a lid body (7) assembled to the outer wall portion (11) to close an opening on one side if the outer wall portion (11); and an insertion hole (8) through which the electric wire (31) is inserted into and out of the electric connection box (1). The lid body (7) may form at least a part of the insertion hole (8).

According to the electrical connection box of the third aspect, in a state where the lid body (for example, the lower cover) is assembled to the electric connection box and the electric wire is inserted into the insertion hole (that is, without removing the lid body), an operation of accommodating the electronic component for retrofitting into the accommodating portion and connecting the electric wire with connector to the electronic component can be performed from the opening on the other side of the outer wall portion. Therefore, the workability of the operation of retrofitting the electronic component can be improved.

According to a fourth aspect of the present disclosure, a wire harness (3) includes: the electric connection box (1) according to any one of the first to third aspects, and an electric wire with connector (2a) to be connected to the electronic component (5). The electric wire holding portion (14) is configured such that: the groove width (D2) in the narrow portion (15c) is smaller than an electric wire diameter (D1) of the electric wire with connector (2a), the groove width (D3) in the groove inlet portion (15a) is equal to or larger than the electric wire diameter (D1); and a groove width (D4) between the narrow portion (155c) and the groove deepest portion (15b) has a dimension that prevents the connector (32) of the electric wire with connector (2a) from passing through. The electric wire with connector (2a) is held by the electric wire holding portion (14) in a state where the electric wire (31) is sandwiched by the electric wire holding portion (14) between the narrow portion (15c) and the groove deepest portion (15b) of the electric wire holding portion (14).

According to the wire harness of the fourth aspect, the electric wire holding portion of the body of the electric connection box has the slit-shaped groove configured to be able to hold the electric wire with connector to be connected to the electronic component by sandwiching the electric wire with connector in the radial direction. The electric wire holding portion has the narrow portion between the groove inlet portion and the groove deepest portion of the electric wire holding portion, and is configured such that the groove width in the narrow portion is smaller than the electric wire diameter of the electric wire with connector, and the groove width in the groove inlet portion is equal to or larger than the electric wire diameter. Therefore, when temporarily holding the electric wire with connector for retrofitting in the electric connection box, the electric wire with connector is pushed from the groove inlet portion toward the groove deepest portion of the electric wire holding portion, so that the electric wire can pass through while the narrow portion of the electric wire holding portion is spread by the electric wire, and the electric wire can be temporarily held between the narrow portion and the groove deepest portion. Here, the groove width between the narrow portion and the groove deepest portion is large enough to prevent the connector of the electric wire with connector from passing therethrough, so that the connector can be temporally temporarily held in a state of being placed on the slit peripheral edge of the electric wire holding portion. Therefore, when the electric wire with connector is temporarily held by the electric wire holding portion, the electric wire is prevented, by the narrow portion, from being unintentionally separated from the electric wire holding portion. Further, it is not necessary to pull out the electric wire with connector for retrofitting from the accommodating portion as in the example of the related art described above, so that the wasteful extra length oldie electric wire can be reduced. In addition, the operation of pushing the electric wire with connector into the slit of the electric wire holding portion can be performed from a side (for example, the lower side of the accommodating portion described above) on which an ordinary electric wire with connector, which is not for retrofitting, is assembled to the accommodating portion. Therefore, the workability of the temporary holding work can be improved. Therefore, the wire harness having the configuration is superior to the wire harness in the related art in temporarily holding the electric wire with connector for retrofitting.

What is claimed is:

1. An electric connection box comprising:
   a body including an accommodating portion inside the body, the accommodating portion being configured to accommodate an electronic component, wherein
   the body includes an electric wire holding portion inside the body, the electric wire holding portion having a slit-shaped groove configured to radially sandwich and hold an electric wire extending from a connector to be connected to the electronic component,
   the groove of the electric wire holding portion includes: a groove inlet portion; a groove deepest portion; and a narrow portion between the groove inlet portion and the groove deepest portion,
   a groove width in the narrow portion is narrower than a groove width in the groove inlet portion,
   the groove width in the narrow portion is narrower than a groove width in the groove deepest portion, and
   the narrow portion is configured to be elastically deformable, and the narrow portion widens to allow the electric wire to pass therethrough when the electric wire is pushed from the groove inlet portion toward the groove deepest portion.

2. The electric connection box according to claim 1, wherein
   the accommodating portion includes a hole portion into which the electronic component is inserted, and
   the groove inlet portion is provided in an inner surface of the hole portion to open toward an inside of the hole portion, and the groove is provided to extend in a direction away from the inside of the hole portion.

3. The electric connection box according to claim 1, further comprising:
   an outer wall portion annularly surrounding the accommodating portion;
   a lid body assembled to the outer wall portion to close an opening on one side of the outer wall portion; and
   an insertion hole through which the electric wire is inserted into and out of the electric connection box, wherein
   the lid body forms at least a part of the insertion hole.

4. A wire harness comprising:
   the electric connection box according to claim 1; and
   an electric wire with connector to be connected to the electronic component, wherein the electric wire holding portion is configured such that:
  the groove width in the narrow portion is smaller than an electric wire diameter of the electric wire with connector, the groove width in the groove inlet portion is equal to or larger than the electric wire diameter; and
  a groove width between the narrow portion and the groove deepest portion has a dimension that prevents the connector of the electric wire with connector from passing through, and
the electric wire with connector is held by the electric wire holding portion in a state where the electric wire is sandwiched by the electric wire holding portion between the narrow portion and the groove deepest portion of the electric wire holding portion.

* * * * *